United States Patent [19]

Csillag et al.

[11] Patent Number: 4,772,255

[45] Date of Patent: Sep. 20, 1988

[54] METHOD AND APPARATUS FOR SIZING GRAINS SMALLER THAN 300μ

[75] Inventors: Zsolt Csillag; László Zsémberi; Géza Szentgyörgyi; Tibor Kálmán; Károly Solymár; Gyula Horváth; Pál Bognár; Gyula Ibrányi; Péter Jakos; Tibor Legát, all of Budapest, Hungary

[73] Assignee: Magyar Aluminiumipari Troszt, Budapest, Hungary

[21] Appl. No.: 931,336

[22] Filed: Nov. 14, 1986

[30] Foreign Application Priority Data

Nov. 15, 1985 [HU] Hungary .............................. 4370/85

[51] Int. Cl.[4] .......................... B01D 21/26; B04B 3/00

[52] U.S. Cl. ......................................... 494/37; 99/511; 494/43

[58] Field of Search ........................ 494/43, 37, 56, 57, 494/58, 67, 79, 80; 99/495, 511; 209/134, 135, 132; 210/360.1

[56] References Cited

U.S. PATENT DOCUMENTS 3,858,793 1/1975 Dudrey ................................ 494/43
3,937,397 2/1976 Zitke .................................... 494/43
4,505,697 3/1985 Lee ........................................ 494/37
4,512,760 4/1985 Nicolo .................................. 494/37

*Primary Examiner*—Robert W. Jenkins
*Attorney, Agent, or Firm*—Handal & Morofsky

[57] ABSTRACT

According to the process the grains are led to the surface or ducts of a rotary element farther in than the flange of the rotary element, thus the coarse grains are led to the flange of the rotary element in a counterflow to the sizing medium. In a housing on an impeller deflecting elements are arranged, the carrier medium and the mixture of material to be sized are fed into the housing by medium inlet tubes, and led out by coarse and fine fraction outlet tubes or nozzles, and one inlet disc is arranged above the impeller so that they form an annular assorting space which is divided by deflecting elements into segments, and a passage connected to the inlet tube of the sizing medium is formed between the mantle of the inlet disc and the inner wall of the housing at its upper end, where ducts leading into the assorting space are arranged in the inlet disc farther in than its flange, and which are connected to the carrier medium inlet tube.

16 Claims, 3 Drawing Sheets

METHOD AND APPARATUS FOR SIZING GRAINS SMALLER THAN 300μ

FIELD AND BACKGROUND OF THE INVENTION

The invention relates to a method and apparatus for sizing grains smaller than 300μ. According to the method, the grains suspended in a carrier medium are led to the surface or ducts of a rotary element, meanwhile a sizing medium is introduced on the level of the rotary element in radial direction towards the axis of rotation, the coarse fraction falling down at the flange of the rotary element, and the fine fraction carried off from the axis of rotation, are collected separately. The apparatus is provided with a house and an impeller deflecting elements arranged thereon wherein the house is provided with inlet tubes for the admission of a suspension and a sizing medium as well as with fine and coarse fraction outlet tubes and/or nozzles.

It is well-known that hydrocyclones are generally used for the sizing of fine grains. Hydrocyclones have been used for a long time, however their fundamental drawback is that the separation accomplished with them is not sufficiently sharp. The further-developments of these apparatuses (see for example the West-German Pat. Nos. 2,536,350 or 2,942,099) ensure only very limited result.

Another well-known group of the sizers is represented by the so-called hydraulic separators, functioning in liquid flowing upward within a large tube. The separation is based on the principle that the grains of higher falling velocity than the velocity of the medium fall to the bottom of the tube, while the fine grains move off with the medium on the top.

Their drawback is that the grains fall slowly in the gravitational field, hence the separation only of large sizes is possible, and their output is low even in case of a large diameter. Upon increasing the diameter, the sharpness of separation quickly deteriorates, because a perfectly laminar flow cannot be ensured in the expanding cross sections.

The more up-to-date apparatuses functioning with gaseous medium are the so-called dispersive air separators (see for example the West-German Pat. No. 25 56 383). Here, a spray disc spreading the material and a fan blowing the air are arranged in the upper part of the assorting space. Sharpness of the sizing is inferior to the liquids, since the rotary part induces heavy turbulences disturbing the sizing. These apparatuses, owing to their poor sizing effect, are used only for intermediate, temporary tasks in the preparation technologies.

Known are furthermore the so-called spiral or zig-zag air separators. Such apparatus is disclosed for example in the West-German Patent 2 529 745. These apparatuses consist of a rotary impeller arranged in a stationary house and the spiral or zig-zag paths are formed between the ribs on the impeller's plate. The material to be separated is guided by a carrier medium to the flange of the rotary impeller, where the large grains fall down, while the smaller ones are entrained by the axially injected or induced sizing medium, and they are leaving the apparatus on such spiral path along which an identical discharge force is applied to the grains both in the eddy field or in the rotary ducts.

The sizing of these apparatuses is relatively better than that of those mentioned in the practice, however, they do not ensure a theoretically perfect path curve, nor a perfect sizing. In the zig-zag type apparatuses the gap size does not change according to the requirement that the discharge force should remain constant in the gap duct. Moreover the sizing is imperfect, because, though the fine fraction does not contain coarse grains, the fine grains not getting into the ducts of the impeller, pass with the coarse grains into the coarse fraction.

Such aerodynamic sizer also exists (Hungarian patent application No. 2429/85), which ensures a constant lifting power for the grains to be sized in a theoretically perfect flow tube. This can be accomplished in the apparatus consisting of a house, inlet stub, fine fraction outlet stub and coarse fraction outlet stub, as well as blade crowns connecting the inlet stub to an annular inlet duct. The outlet stubs are arranged vertically and coaxially, and the house is provided with an inlet blade crown and an outlet blade crown. Furthermore the separating or sizing chamber is formed with a rotational hyperboloid mantle between the inlet blade crown and the outlet blade crown.

Although this apparatus provides very good separation, at a given size (diameter) its operational range moves within a fairly narrow interval, since the parameters can be altered only by changing the air velocity and adjustment of the blade angles.

Certain types of centrifuges are also used as sizers (see for example West-German Pat. No. 2 649 382). In these rotary drum type apparatuses the material to be separated flows in a carrier medium in the direction of the drum axis, and the sepration takes place with the aid of the discharge force applied to the grains. The flow time of the medium is selected to be less than the falling time of the smallest grains from the top of the liquid layer to the wall of the drum. Thus removal of the unsettled part of the grains finer than the given size does not represent problem. However, removal of the settled coarse grains is already difficult.

The course grains can be removed intermittently, in this case, however, the apparatus has to be stopped. Further drawback of this solution is the low output and, upon increasing the layer thickness, the running of the machine becomes more and more unstable. Consequently the already settled layer may become agitated again.

Another possibility is the discharge of the coarse grain layer with a worm, resulting in a more stable run of the apparatus, at the same time, however, the settling will be disturbed.

From the fluid mechanics point of view the best solution is the discharge with a nozzle which, however, is the least safe solution, since nozzles, have the tendency to become clogged, which may result in a change of the flow, or even in its stopping in some cases.

Thus in these centrifugal apparatuses, similarly to the spiral or zig-zag sizers, the fine product contains very few grains over the size limit, while the coarse fraction contains a fair amount of fine grains.

SUMMARY AND OBECTS OF THE INVENTION

The object of the present invention is to provide a method and an apparatus which enable the safe and sharp sizing of grains smaller than 300μ in a wide range and with a high output.

In the process, the grains suspended in a carrier medium are led to the surface or ducts of a rotary element, meanwhile a sizing medium is flown on the level of the rotary element in radial direction towards the axis of rotation, the coarse fraction falling down at the flange of the rotary element, and the fine fraction carried off from the axis of rotation are collected separately. In accordance with the invention the grains are led to the surface or ducts of the rotary element farther in than the flange of the rotary element, and thus the coarse grains are led to the flange of the rotary element in a counter-flow of the sizing medium.

In this manner the fine grains are carried back by the sizing medium from the coarse grains led in counter-flow in the centrifugal space, and those together with the other fine grains passing through a uniflow assorting space are carried off in the vicinity of the axis of rotation. Thereby the coarse fraction contains substantially less amount of fine grains than in the case of the traditional solutions.

The apparatus according to the invention consists of a housing and an impeller, where deflecting elements are arranged on the impeller, and the housing is provided with inlet tubes for a carrier medium and for the mixture of material to be sized, as well as coarse fraction outlet tubes and nozzles. According to the invention an inlet disc is arranged above the impeller so that an annular assorting space is formed divided by the deflecting elements into segments is formed between the upper plate of the impeller and lower plate of the inlet disc, and a gap connected to the inlet tube of the sizing medium is located between the mantle of the inlet disc and the inner wall of the housing at its upper end, wherein a duct or ducts leading into the assorting space are arranged in the inlet disc farther in than its flange, which are connected to the carrier medium inlet tube.

The housing, impeller and inlet disc are fixed to each other and to a common driving shaft, and the inner side of the assorting space is connected to the fine fraction outlet tube, or nozzle, while the lower end of the gap between the housing and the inlet disc is connected to the coarse fraction outlet duct or nozzle.

The housing may consist of a lower and upper part, where a coarse fraction outlet duct formed as a conical part with downward reducing diameter is arranged between the inner mantle of the lower part and the outer mantle of the impeller.

In another embodiment the house housing is shaped as a cover, and wherein between its lower flange and the upper flange of the impeller coarse fraction outlet nozzles are formed.

At least that part of the gap being between the mantle of the inlet disc and the housing connected to the assorting space is truncated cone-shaped with downward increasing diameter.

In a preferred embodiment the radial section of the lower plate of the inlet disc and the upper plate of the impeller is zig-zag shaped.

The deflecting elements dividing the assorting space into segments preferably have reclining shape in relation to the direction of rotation and vertical walls.

The inlet disc may be formed with lower and upper parts and the ducts run between the two parts.

The housing, impeller and parts of the inlet disc are screwed to each other suitably with the insertion of spacers. The spacers are repleceable and at least a certain part of them is formed in one piece with the deflecting elements. A replaceable transfer edge may be arranged on the inner end of the assorting space.

If the carrier medium and the sizing medium are liquids, slurry inlet tubes are used and which are arrange centrally and uniaxially on the upper part of the apparatus.

In case of gaseous carrier medium or sizing medium, the suspension inlet nozzle may be provided with a vibrating charging hopper and a dispersing plate or spray cone, and the sizing medium inlet nozzle may be fitted with choking ring. In this case fan blade shaped ribs are arranged in the gap between the inlet disc and the housing. In this construction a collecting channel containing a fan and a cyclone is connected to both the coarse fraction and fine fraction outlet nozzles.

The invention is based primarily on the recognition, that the sharpness of the sizing which is carried out in the centrifugal part of the impeller can be decisively improved by preventing the fine grains from falling down at the flange of the impeller. This is accomplished according to the invention by admitting the medium to be separated farther in that the flange of the impeller and, when the coarse grains move in counterflow in the gravitational field towards the flange of the impeller, such counter-flow will carry back the fine grains mixed among the coarse grains into the counter-flow part of the assorting space, and from there to the outlet duct in the vicinity of the axis of rotation.

In this manner a very sharp sizing and a high output can be achieved with the solution according to the invention. The apparatus is extremely safe and suitable for the sizing of grains smaller than 300μ.

A further advantage of the apparatus according to the invention is its explosion-proof construction. This is very important for example in the production of aluminium pigment, when the sizing has to be carried out in an inflammable and explosive white spirit medium.

BRIEF DESCRIPTION OF THE DRAWINGS

Further details of the invention are described by way of examples with the aid of drawings, in which.

DESCRIPTION OF THE PREFERRED EMBODIMENTS

Figure 1:
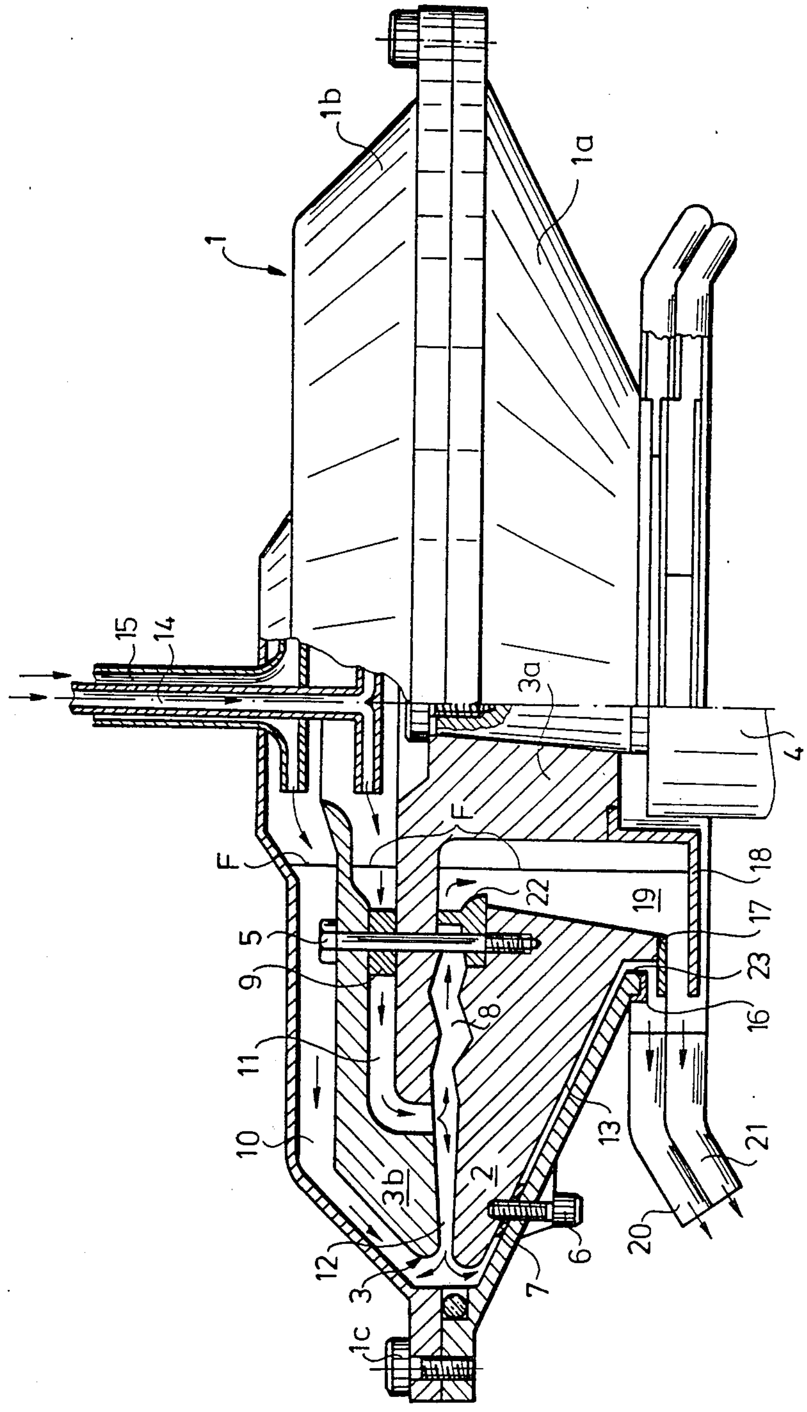
FIG. 1 is a semi-sectional view of a suitable construction of the apparatus according to the invention.

The parts of the embodiment shown in FIG. 1 are arranged in a housing 1, or are built together with it. The housing 1 consists of a lower part **1*a* and an upper part 1*b*. The parts 1*a* and 1*b* are fastened with screws 1*c*** with the insertion of a packing ring.

An impeller 2 is arranged within and on the bottom of the housing 1. This is fastened together with an inlet disc 3. The inlet disc 3 consists of a lower part **3*a* and an upper part 3*b*. The lower part 3*a* is connected to a driving shaft 4. The lower part 3*a*, upper part 3*b* and impeller 2 are held together with screws 5. The impeller 2 and housing 1 are connected with screws 6. The parts of housing 1, impeller 2 and inlet disc 3 are kept from each other in a position by spacers 7, 8 and 9 pulled on to screws 5 and 6** such as to leave adequate gap between them.

A gap or passage 10 between the upper part **3*b* of inlet disc 3 and the upper part 1*c* of housing 1** forms the sizing medium guiding duct.

The medium to be separated passes through duct 11 between the lower part **3*a* and upper part 3*b*** of inlet disc 3 into the assorting space 12 which is actually a gap between the impeller 2 and inlet disc 3.

A gap or passage formed between the lower part 1*b* of house 1 and impeller 2 forms an outlet duct 13.

The height of above gaps, or ducts is determined by the mentioned spacers 7, 8 and 9:

Spacers 7 determining the height of the outlet duct 13 are essentially disc-shaped washers, and spacers 9 determining the height of duct 11 between the lower part 3*a* and upper part 3*b* of inlet disc 3 are also similarly shaped washers.

Spacers 8 determining the height of assorting space 12 between impeller 2 and inlet disc 3 are not disc-shaped washers, but they are formed as deflecting elements with vertical wall, slightly reclining in relation to the axis of rotation of the apparatus, and they divide the assorting space 12 into several segments.

A centrally arranged suspension inlet tube 4 and a liquid inlet tube 15 are connected to the upper part of the apparatus. These are coaxially arranged in the present solution and admit the media below the upper part 1*b* of the housing 1.

Deflecting elements 16, 17 and 18 are arranged on the bottom part of the apparatus, where the media leave with the coarse and fine grains. These elements guide the sized grains from an outlet duct 13 and a collecting channel 19 connected to the assorting space 12 into the coarse fraction outlet tube 20 and fine fraction outlet tube 21.

A transfer edge 22 is formed between the assorting space 12 and collecting channel 19. This is arranged to protrude into the collecting channel 19, i.e. extending out of the inner wall of the impeller 2, and it is replaceable to have the position of the edge suitable for setting the required parameters.

A similar transfer edge 23 is located between the outlet duct 13 and coarse fraction outlet tube 20, but its position is not adjustable in the present embodiment.

The apparatus functions as follows.

The material to be sized is admitted in the form of slurry through suspension inlet tube 14 into the apparatus. The slurry flows through duct 11 and passes approximately midway into the assorting space 12. At the same time the sizing medium flows through the liquid inlet tube 15 into the gap 10 between the inlet disc 3 and housing 1. The amount of liquid admitted is controlled as to have a continuous flow in the assorting space 12 and in the outlet duct 13. Since the apparatus rotates at high speed during operation, the shape of the through-flowing liquid is essentially annular, and its level F is in the collecting channel 19, i.e. in the upper part of gap 10 and duct 11.

The liquid admitted as the sizing medium flows into the assorting space 12 from the outside and moves against the centrifugal field towards the axis of rotation, consequently the coarse grains of the slurry admitted through duct 11, which move outward upon the effect of the centrifugal force, pass in a counter-flow to the flange of the impeller 2. As a result, the fine grains entrained by the coarse grains return with the flow of the sizing medium into the uniflow part of the assorting space 12, from where they leave together with the fine fraction. Similarly after-sizing takes place in the internal section of the assorting space 12, which ensures cleansing of the fine product from the coarse grains incidentally passing through because of the eddies arising around the inlet of the slurry.

The separation grain size in the apparatus is determined by the speed of rotation (r.p.m) and flow velocities. On the other hand the flow velocities are determined by the gap sizes and liquid level F, as well as by the level differences between the transfer edges 22 and 23. Suitably there is an expansion in the cross section at the liquid inlet 14 to reduce fluctuation of the liquid level. It is clearly seen in FIG. 1 that the media emerging from the slurry inlet 14 and sizing medium inlet tubes 15 pass into channels of substantially wider cross section.

When setting the height of the assorting space 12, the discharge effect of the centrifugal force and the lifting power arising from the velocity of the liquid have to be taken into account. These must be in the right balance with respect to the employed separation grain size. From the above condition it follows that the cross section of the apparatus increases with a reduction of its radius, hence the assorting space 12 has to be formed accordingly. The wall of the assorting space 12 was formed to zig-zag in cross section in order, to return the grains drifting close to the wall into the main flow and to further improve the efficiency of sizing.

The product flowing out of the outlet duct 13 and collecting channel 19 is guided by deflectors 16, 17 and 18 into the outlet tubes 20 and 21, from where it flows freely into the collecting tanks.

Figure 2:
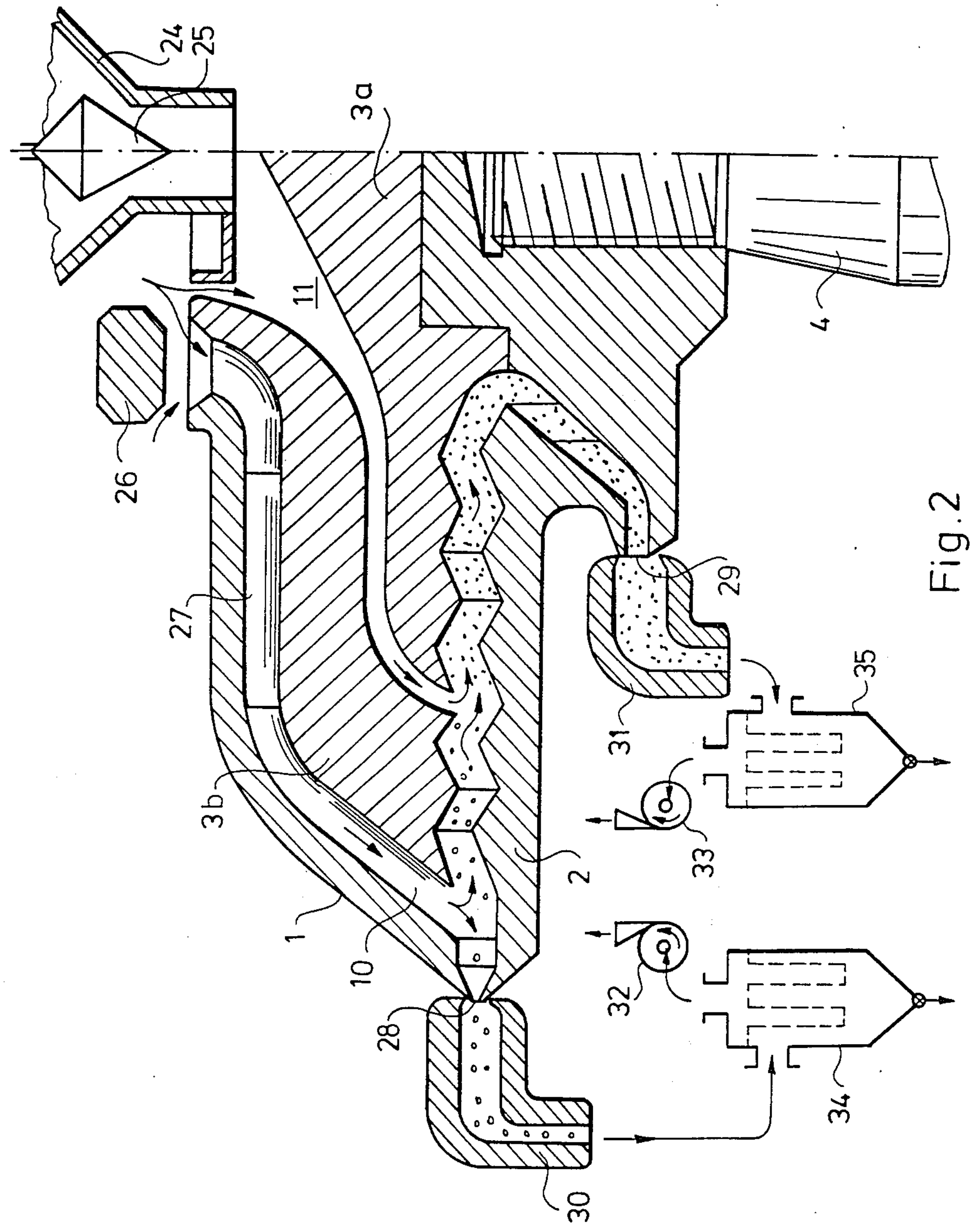
FIG. 2 is a semi-section of another construction of the apparatus according to the invention.

The construction of the apparatus according to the invention as shown in FIG. 2 functions with a gaseous carrier—and sizing medium, preferably with air (or an insert gas). Accordingly the material to be separated is admitted through a vibrating charging hopper 24 into the apparatus. A spray cone 25 is arranged in the through of a charging hopper 24 and, the flow is ensured by a small amount of false or supplemental air 26*a* drawn in through the gap 26*b*.

The sizing medium, i.e. the air drawn in from the surroundings passes in this case also into the gap 10 between the inlet disc 3 and housing 1, in a quantity controlled by a choking ring 26. According to the presented solution fan blade-shaped ribs 27 are arranged in the gap 10 to facilitate the flow.

The separated materials leave the apparatus through nozzles 28 and 29.

The nozzle 28 is formed by the gap between the impeller 2 and housing 1, and the nozzle 29 by the lower flanges of the impeller 2 and inlet disc 3. The coarse product passes through a collecting channel 30 connected to nozzle 28 and the fine product through a collecting channel 31 connected to nozzle 29 into the storage tanks.

The flow through the channels is brought about by fans 32 and 33. For dust-proof air and protection of the fan, cyclones 34 and 35 are arranged between collecting channels 30 and 31 and fans 32 and 33.

From the foregoing it follows that the apparatus according to the invention can be operated equally with liquid and gaseous media and it provides a very sharp sizing or separation in both cases. Its output even at relatively low speed (500–3000/min) is high: 100 kp/h.

Its advantage is that several sizing heads can be arranged on the same shaft, and thus either sharp, fine or several types of products cn be obtained from the overall apparatus, or its output will be increased.

In the course of the process or operation of the apparatus according to the invention, the radii and cross sections for an existing rotary head are given in the practice, or the inlet radii can be altered within narrow limits by changing the feeding speed. Thus the separation can be controlled by the stepless changing of the feeding speed and rotational velocity, or by adjustment of the transfer edge.

In addition there is a reserve solution for the control, since the outlet gap can be changed according to predetermined steps by refitting the rotary head and replacing the spacer plates.

It is the function of the operators to determine the best setting based on experience of past runs. Namely the machine will function with the lowest output (processing capacity) at the optimum sizing. Execution of the task which is the, attaining of a given quality, does not always requires optimum sizing, in such case the processing capacity of the sizer will be higher, and its operation more economical. The economic optimum cannot be calculated in advance, but only after a series of experiments. The example presented was taken from such series of experiments in order, to demonstrate that at a setting corresponding to the sharpest separation, the sizing or separating efficiency of the experimental apparatus surpasses by far those hitherto known.

Figure 3:
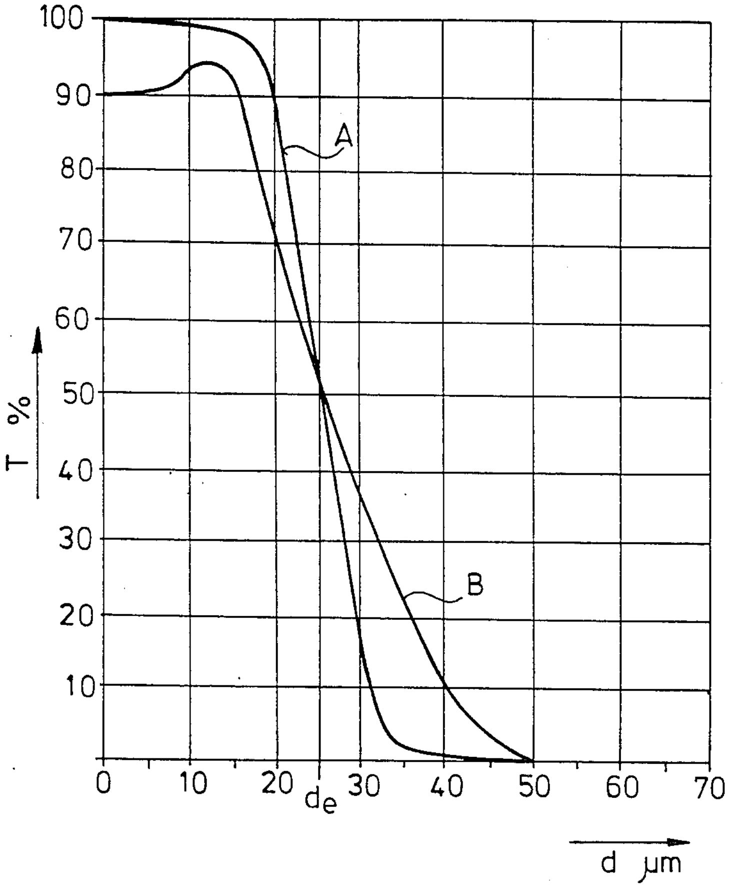
FIG. 3 is a tromp-curves of the apparatus according to the invention and of a spiral sizer.

Sharpness of the sizing, or separation is characterized by the so-called Tromp-curves. The curves indicate the mass percentage T%/of the grains of a given size passing into one or the other product. The perfect sizing is represented by a straight line perpendicular to an abscissa axis (d=grain size), which intersects the abscissa axis at the separation grain size. FIG. 3 shows the Tromp-curves of the apparatus according to the invention and a spiral air separator representing top-technology related to the same material. The diagram clearly demonstrates that the Tromp-curve (A) of the sizer according to the invention approaches closer the theoretically perfect sizing, i.e. its run is steeper than that of the spiral sizer (B). Generally the straight section of the curves between 25 and 75 T% is evaluated, characterizing them particularly with their directional tangent, or with the pertinent grain size interval. In case of the apparatus according to the invention this interval width, that represents the majority of the size of "faulty grains" is less than half of the one which can be expected with the spiral apparatus. After all the curves clearly demonstrate the improved sizing capacity i.e. industrial applicability of the apparatus according to the invention.

Whereas the presented constructions demonstrate well the apparatus according to the invention, obviously they serve only as examples, since they can be produced in several other constructional variations as well. For example it is possible to use a construction with a nozzle even for an apparatus functioning with liquid. In this case the velocities of the liquid will be considerably higher, i.e. the minimal separation limit may mean greater sizes.

According to a further embodiment, the discharge from the collecting channels can be solved with the aid of a stripping tube, instead of the shown free outflow.

We claim:

1. A method for sizing grains smaller than 300$\mu$ into coarse and fine fractions comprising the steps of leading the grains suspended in a carrier medium to a space defined by a surface of a rotating rotary element, introducing a sizing medium on the level of the rotary element in radial direction towards the axis of rotation, the coarse fraction falling down a circumferential flange of the rotary element, and the fine fraction driven by said sizing medium carried off at the axis of rotation said coarse and said fine fractions being collected separately, wherein the grains to be separated are led to said space defined by the surface of the rotary element at a position radially inward of said flange of the rotary element, the coarse grains being led to the flange of the rotary element in a counter-flow to the sizing medium.

2. An apparatus for sizing or separating grains smaller than 300$\mu$, into coarse and fine fractions comprising a housing, an impeller, deflecting elements arranged on the impeller, tube means for introducing into said housing a carrier medium entraining a mixture of material to be sized, said tube means including a carrier inlet tube, coarse and fine fraction outlet means, an inlet disc arranged above the impeller and forming an annular sorting space therewith for introducing said medium into said sorting space, said deflecting elements dividing said sorting space into segments between an upper surface of the impeller and a lower surface of the inlet disc, and a passage connected to the inlet means of the sizing medium defined between a top surface mantle of the inlet disc and an inner wall of the housing at an upper end of said housing, wherein a duct leading into the sorting space is defined by the inlet disc, said duct having an outlet port coupled to said sorting space radially inwardly of a circumferential flange on said disk, and said duct having an inlet port connected to a carrier inlet tube, the housing, impeller and inlet disc being fixed to each other and to a common driving shaft, an inner side of the sorting space being connected to the fine fraction outlet means, or nozzle, and the radially outward end of the passage between the housing and the inlet disc being connected to the coarse fraction outlet means or nozzle.

3. The apparatus as claimed in claim 2, wherein said housing comprises a lower and an upper part said coarse fraction outlet means being formed at said lower part as a conical member with a downward reducing diameter and is arranged between the inner surface of the lower part and the bottom surface of the impeller.

4. The apparatus as claimed in claim 2, wherein the housing is shaped as a cover and said coarse fraction outlet means is formed between a circumferential flange on the inside surface of said housing and the upper portion of a circumferential flange on the impeller.

5. The apparatus as claimed in claim 4, wherein the suspension inlet means is provided with a vibrating charging hopper and with a dispersing plate or spray cone, and the sizing medium inlet means includes a choking ring, and wherein fan blade shaped ribs are arranged in the passage formed between the inlet disc and the housing and collecting channels containing fan and cyclone means are connected to the coarse fraction and fine fraction outlet means.

6. The apparatus as claimed in claim 2 wherein at least a part of the passage located between the top surface mantle of the inlet disc and the housing and connected to the sorting space is frustro-conical with a downward increasing diameter.

7. The apparatus as claimed in claims 2, wherein a radial section of the lower surface of the inlet disc and the upper surface of the impeller are zig-zag shaped.

8. The apparatus as claimed in claim 2, wherein deflecting elements dividing the sorting space into segments are provided and have a slanted shape in relation to the direction of rotation of said driving shaft.

9. The apparatus as claimed in claim 2, wherein the inlet disc comprises lower and upper parts and duct means for introducing said carrier medium is formed between the two parts.

10. The apparatus as claimed in claim 9 wherein said housing impeller and said upper and lower parts of the inlet disc are screwed to each other with the insertion of spacers.

11. The apparatus as claimed in claim 10, wherein at least a predetermined part of the spacers is formed in one piece with the deflecting elements.

12. The apparatus as claimed in claim 10 wherein the spacers are configured and dimensioned to be replaceable.

13. The apparatus as claimed in claim 2, wherein a replaceable transfer edge is mounted at the inner end of the assorting space.

14. The apparatus as claimed in claim 2, wherein inlet means is arranged centrally and uniaxially on the upper part of the housing.

15. The apparatus as claimed in claim 2, wherein said outlet means is an outlet duct.

16. The apparatus as claimed in claim 2, wherein said outlet means is an outlet nozzle.

* * * * *